United States Patent
Schmidt et al.

(10) Patent No.: US 11,450,865 B2
(45) Date of Patent: Sep. 20, 2022

(54) FUEL CELL SYSTEM HAVING IMPROVED GAS DIFFUSION LAYERS AND MOTOR VEHICLE HAVING A FUEL CELL SYSTEM

(71) Applicants: AUDI AG, Ingolstadt (DE); VOLKSWAGEN AG, Wolfsburg (DE)

(72) Inventors: Lasse Schmidt, Wolfsburg (DE); Hannes Scholz, Isenbüttel (DE); Sebastian Kirsch, Sassenburg (DE)

(73) Assignees: VOLKSWAGEN AG, Wolfsburg (DE); AUDI AG, Ingolstadt (DE)

(*) Notice: Subject to any disclaimer, the term of this patent is extended or adjusted under 35 U.S.C. 154(b) by 25 days.

(21) Appl. No.: 16/962,719

(22) PCT Filed: Dec. 4, 2018

(86) PCT No.: PCT/EP2018/083483
§ 371 (c)(1),
(2) Date: Jul. 16, 2020

(87) PCT Pub. No.: WO2019/141427
PCT Pub. Date: Jul. 25, 2019

(65) Prior Publication Data
US 2020/0350603 A1 Nov. 5, 2020

(30) Foreign Application Priority Data
Jan. 19, 2018 (DE) .................... 10 2018 200 847.7

(51) Int. Cl.
*H01M 8/04007* (2016.01)
*H01M 8/2465* (2016.01)
*H01M 8/249* (2016.01)

(52) U.S. Cl.
CPC ....... *H01M 8/04007* (2013.01); *H01M 8/249* (2013.01); *H01M 8/2465* (2013.01); *H01M 2250/20* (2013.01)

(58) Field of Classification Search
CPC ................................................ H01M 8/04007
See application file for complete search history.

(56) References Cited

U.S. PATENT DOCUMENTS

| | | | | |
|---|---|---|---|---|
| 2004/0253499 | A1* | 12/2004 | Sato ................... | H01M 8/2483 429/434 |
| 2005/0130023 | A1* | 6/2005 | Lebowitz ............ | H01M 8/1023 429/534 |

(Continued)

FOREIGN PATENT DOCUMENTS

| | | |
|---|---|---|
| DE | 11 2004 001 327 B3 | 1/2008 |
| DE | 10 2008 043 827 A1 | 11/2009 |

(Continued)

OTHER PUBLICATIONS

Temperature Distribution and Thermal Conductivity Measurements of Chirality-Assigned Single-Walled Carbon Nanotubes by Photoluminescence Imaging Spectroscopy, Kazuki Yoshino, ACS Omega (Year: 2018).*

(Continued)

*Primary Examiner* — Brian R Ohara
(74) *Attorney, Agent, or Firm* — Seed Intellectual Property Law Group LLP

(57) ABSTRACT

A fuel cell system includes a fuel cell stack formed from a plurality of cell units, which have gas diffusion layers, wherein the gas diffusion layer of at least one of the edge cell units has a heat transfer mechanism of reduced efficiency in comparison with the gas diffusion layer of a cell unit from the middle of the fuel cell stack. A motor vehicle may include such a fuel cell system.

10 Claims, 4 Drawing Sheets

(56) References Cited

U.S. PATENT DOCUMENTS

2005/0202294 A1* 9/2005 Gallagher ......... H01M 8/04231
429/434
2012/0202134 A1 8/2012 Badrinarayanan et al.

FOREIGN PATENT DOCUMENTS

| DE | 10 2010 026 318 A1 | 3/2011 |
| DE | 21 2012 000 223 U1 | 7/2014 |
| JP | 2007-227227 A | 9/2007 |
| JP | 2013-084486 A | 5/2013 |
| WO | 2008/106946 A2 | 9/2008 |

OTHER PUBLICATIONS

Steady Heat Conduction (Year: 2022).*

* cited by examiner

FUEL CELL SYSTEM HAVING IMPROVED GAS DIFFUSION LAYERS AND MOTOR VEHICLE HAVING A FUEL CELL SYSTEM

BACKGROUND

Technical Field

Embodiments of the invention relate to a fuel-cell system with a fuel-cell stack formed from a plurality of cell units having gas diffusion layers. Embodiments of the invention further relate to a motor vehicle with an improved fuel-cell system.

Description of the Related Art

The cell unit of a fuel-cell system comprises a membrane-electrode assembly which has a proton-conductive membrane which is respectively assigned an electrode on both sides. The membrane-electrode assembly is configured to conduct the electrochemical reaction of the fuel cell. In this case, a fuel—in particular, hydrogen—is guided to the anode-forming electrode, where it is catalytically oxidized, with the release of electrons, to protons. These protons are transported to the cathode through the proton-conductive membrane. The electrons discharged from the cell unit preferably flow via an electrical consumer to an electric motor for driving a vehicle or to a battery. The electrons are then conducted to the cathode, or electrons are provided thereon. At the cathode, the oxidizing agent (in particular, oxygen or oxygen-containing air) is reduced by accepting the electrons to anions, which react directly with the protons to form water.

With the aid of a bipolar plate, the fuel and the cathode gas are conducted to gas diffusion layers which guide the respective gases, diffusely distributed, to the electrodes of the membrane-electron assembly.

Several of these cell units are combined into a fuel-cell stack to increase the performance of the fuel-cell system.

In practice, it has been found that the edge cell units differ in their behavior from the cell units from the middle of the fuel-cell stack, since the heat generated during the electrochemical reaction is dissipated from the edge cell units more rapidly to the environment of the fuel-cell stack, so that the edge cell units cool off more strongly than the cell units from the middle of the fuel-cell stack. The edge cell units furthermore have a lower voltage, and there is the risk that flooding the edge cell units will limit their service life and cause them to lose freeze-start capability, if, namely, the bypass temperature is below the freezing point of water.

In order to avoid the problems associated with the heat loss of the edge cell units, it has been proposed to use electric end-cell heaters, which actively compensate for the heat loss of the edge cell units, but this consumes energy, which reduces the efficiency of the fuel-cell stack. Difficulties also arise in that the electrical end-cell units require an accurate temperature sensor system in order to introduce, in conjunction with operating characteristics of the fuel-cell stack and the end cell heaters, exactly the required heat into the edge cell unit.

DE 11 2004 001 327 B3 discloses a fuel-cell system consisting of several fuel-cell stacks, divided by manifolds, through which a coolant passes, thereby cooling internal cells of the fuel-cell stack.

WO 2008106946 A2 discloses a heat-conducting plate which is arranged in a cell stack between cell units in order to remove heat from the interior of the cell stack.

DE 21 2012 000 223 U1 discloses, in a fuel-cell stack, a cooling device by means of which heat can be diverted from the interior of the fuel-cell stack.

BRIEF SUMMARY

Embodiments of the invention are based upon the aim of providing a fuel-cell system in which the problems described above are eliminated or at least mitigated. A further aim is to provide a motor vehicle having an improved fuel-cell system.

According to some embodiments of the invention, the cell units of a fuel-cell stack have no uniform thermal properties, but, in at least one of the edge cell units, the gas diffusion layer has a heat transfer mechanism of reduced efficiency in comparison with the gas diffusion layer of a cell unit from the middle of the fuel-cell stack, so that the increased heat loss of the edge cell unit can be compensated for by reduced heat dissipation. In principle, any known heat transfer mechanism can be utilized; however, since a modification of the flow-bound heat transfer at the gas diffusion layer in comparison to the central cell units can be difficult to design, the thermal conductivity of the gas diffusion layer of the edge cell unit may be reduced in comparison with the heat conductivity of the gas diffusion layer of the cell unit from the middle of the fuel-cell stack. In some embodiments, cell units with the modified gas diffusion layer are arranged at the two edges of the fuel-cell stack.

In some embodiments, the heat produced in the edge cell units (with gas diffusion layers of reduced efficiency or with so-called modified gas diffusion layers) is dissipated more slowly to the environment than in the case of cell units having a non-modified gas diffusion layer, so that the temperature of the edge cell unit increases, wherein the modification of the thermal conductivity of the gas diffusion layer can be influenced by the production method of the gas diffusion layers and their aftertreatment, and a coordination of the heat conductivity with the extent of the heat loss at the edge position is possible.

In some embodiments, a plurality of adjacent cell units on the edge are combined to form a cell-unit block in which the thermal conductivity of the gas diffusion layer of the cell units involved is reduced in comparison with the thermal conductivity of the gas diffusion layer in a central cell unit. In this embodiment, the compensation for the heat losses does not have to be achieved with only one edge cell unit, but, rather, several adjacent cell units can be used to achieve the desired effect through the entire cell-unit block.

The heat loss in the cell-unit block towards the edge is not constant, so that it is favorable if the thermal conductivity of the gas diffusion layer of the cell units involved in the cell-unit block falls toward the edge, wherein, in particular, the thermal conductivity of the gas diffusion layers in the cell-unit block can drop continuously—in particular, in a gradient—so that, as a result, a constant temperature of the cell units over the entire expanse of the fuel-cell stack is achievable.

However, there are cost advantages when fewer different components, and thus cell units, are required for the production of a fuel-cell stack, so that there is the possibility that the thermal conductivity of the gas diffusion layers in the cell units falls in stages, with several cell units at one stage. The cell-unit block may comprise between three and twenty cells. Since corresponding cell-unit blocks can be used on both edge layers of the fuel-cell stack, between 6 and 40 cell units are available for generating a uniform temperature of the individual cell units over the entire expanse of the fuel-cell stack. In other words, two of the cell-unit blocks may be provided, and one of the cell-unit blocks in each case may delimit the cell units in the middle of the fuel-cell stack at the edge.

A motor vehicle having a fuel-cell system having the above-described characteristics is characterized by improved energy efficiency, since electric end cell heaters, in particular, can be dispensed with, and all of the energy generated in the fuel-cell system can be used by the motor vehicle.

DETAILED DESCRIPTION

Figure 1:
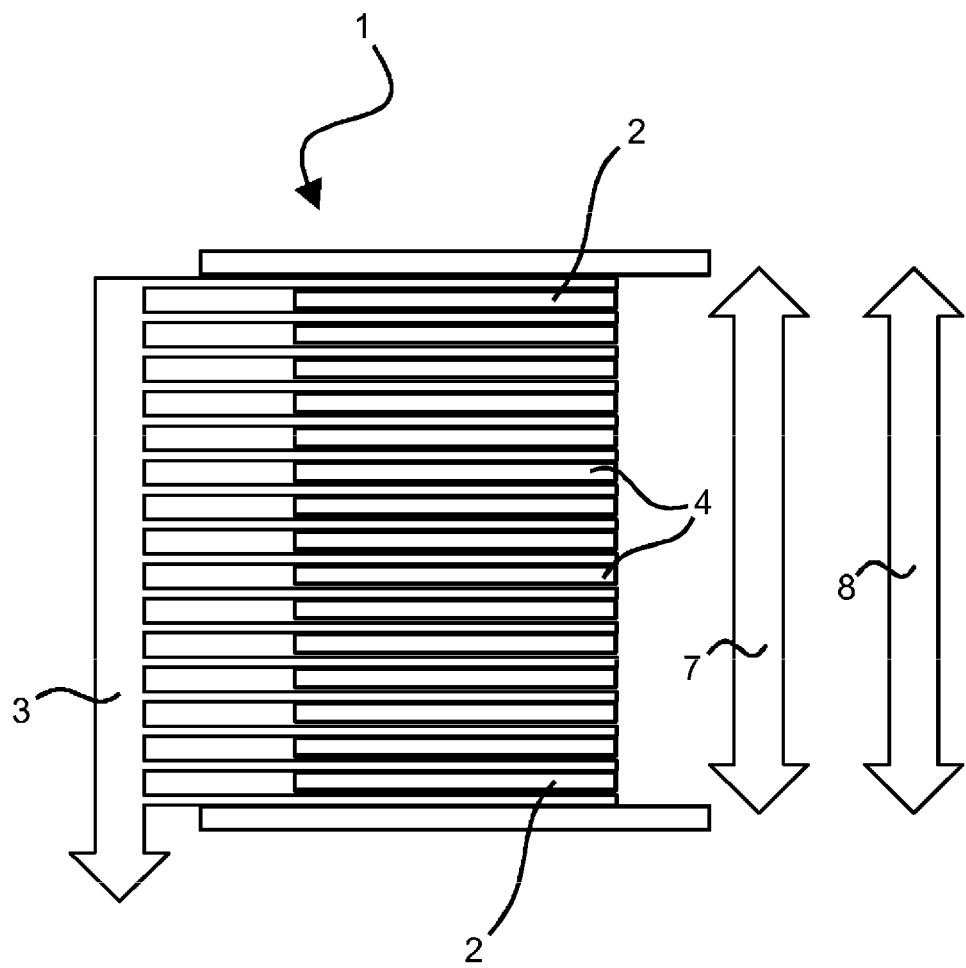
FIG. 1 illustrates a schematic depiction of a fuel-cell system having a fuel-cell stack, formed from cell units having gas diffusion layers modified as a function of their position in the fuel-cell stack.
Figure 7:
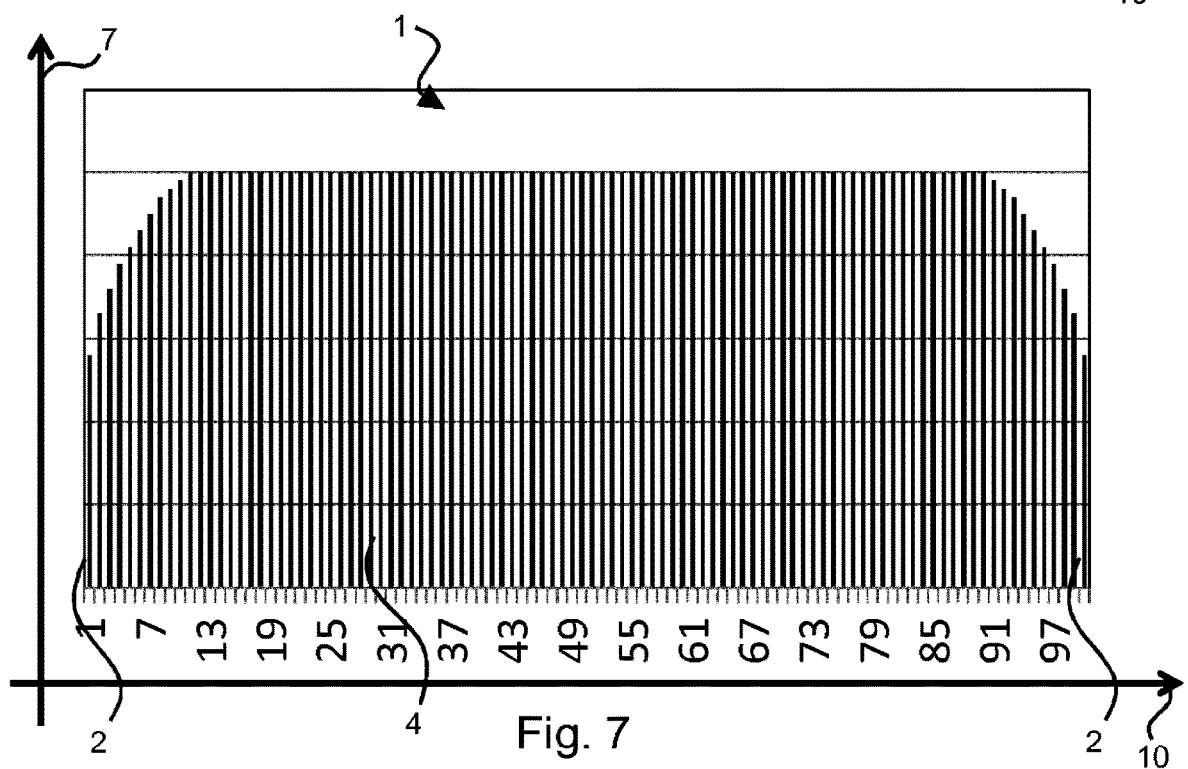
FIG. 7 illustrates a temperature distribution in the fuel-cell stack arising from the thermal conductivities illustrated in FIG. 6, known from the prior art.

FIG. 1 schematically shows a fuel-cell stack 1 of a fuel-cell system, which fuel-cell stack consists of several cell units 2, 4 in which the electro-chemical reaction for providing electrical energy takes place. Through the fuel-cell stack 1 flows a coolant 3 which is intended to dissipate excess heat 8 within the fuel-cell stack 1 and to provide a temperature 7 in the optimum temperature interval. However, the edge cell units 2 lose heat 8 not only through the coolant 3, but also by dissipating heat 8 to the environment, so that the temperature 7 of the edge cell units 2 drops and, in particular, the optimum temperature interval is also departed from, as shown in FIG. 7. In order to compensate for this, the gas diffusion layer of at least one of the edge cell units 2 has a heat transfer mechanism with reduced efficiency in comparison with the gas diffusion layer of a cell unit 4 from the middle of the fuel-cell stack 1, for example, in the exemplary embodiment shown, a reduced thermal conductivity 9 of the gas diffusion layer of the edge cell units 2 at both edge positions.

Figure 2:
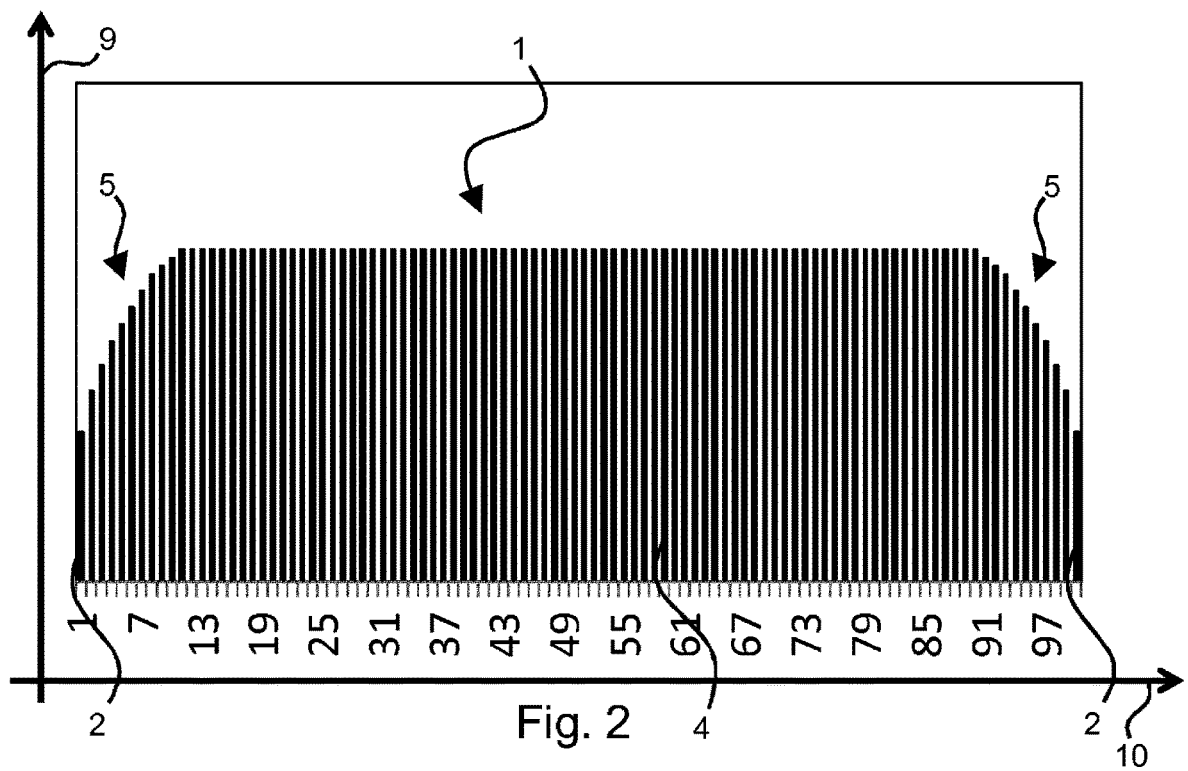
FIG. 2 illustrates thermal conductivity of the gas diffusion layer of a cell unit as a function of its position in the fuel-cell stack.
Figure 3:
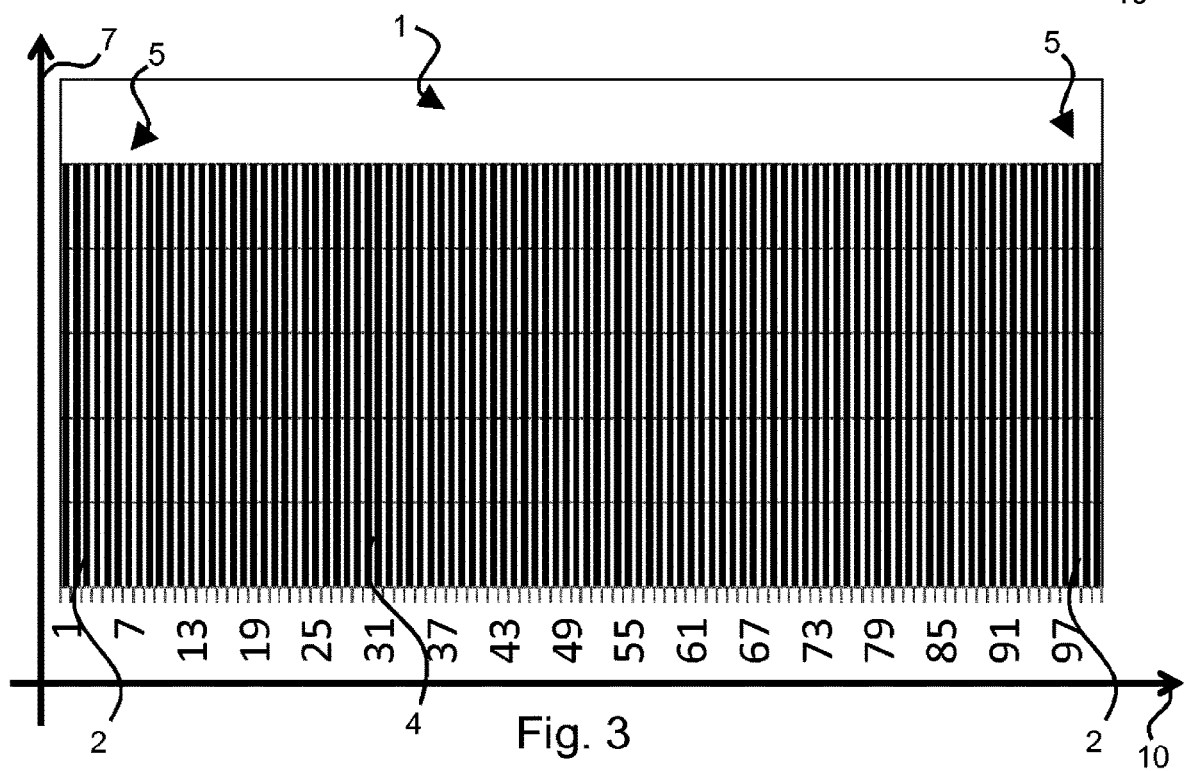
FIG. 3 illustrates temperature distribution in a cell unit as a function of its position in the fuel-cell stack arising from the thermal conductivities illustrated in FIG. 2.

FIG. 2 shows the distribution of the thermal conductivity 9 of the gas diffusion layers as a function of the position of the cell unit 2, 4 within the fuel-cell stack 1, wherein it is apparent that a plurality of adjacent cell units 2 at the edge are combined to form a cell-unit block 5 in which the thermal conductivity 9 of the gas diffusion layer of the involved cell units 2, in comparison with the thermal conductivity 9 of the gas diffusion layer of a central cell unit 4, is reduced, for example, reduced continuously, so that a gradient of the thermal conductivity 9 of the gas diffusion layers in the cell-unit block 5 results. Corresponding to the depiction in FIG. 3, this results in a constant temperature distribution being present over the entire length of the fuel-cell stack 1.

Figure 4:
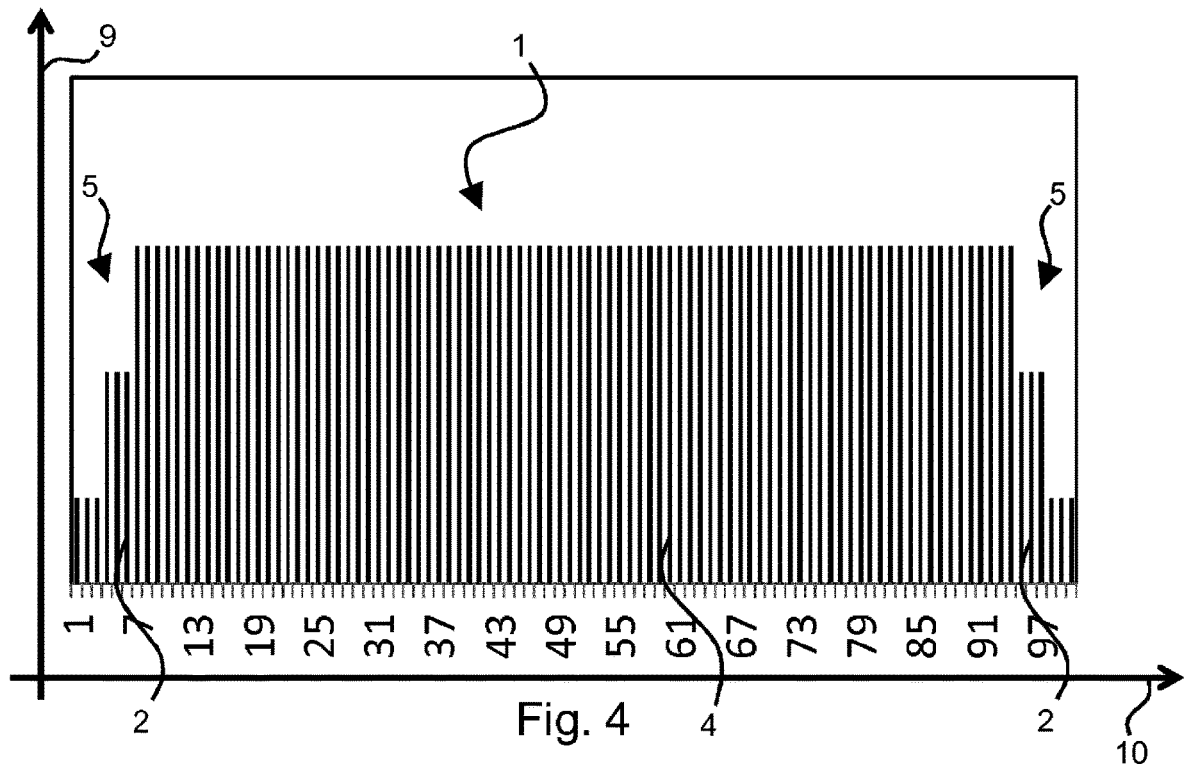
FIG. 4 illustrates a thermal conductivity, adapted in stages, of the gas diffusion layers of cell units located on the edges of a fuel-cell stack.
Figure 5:
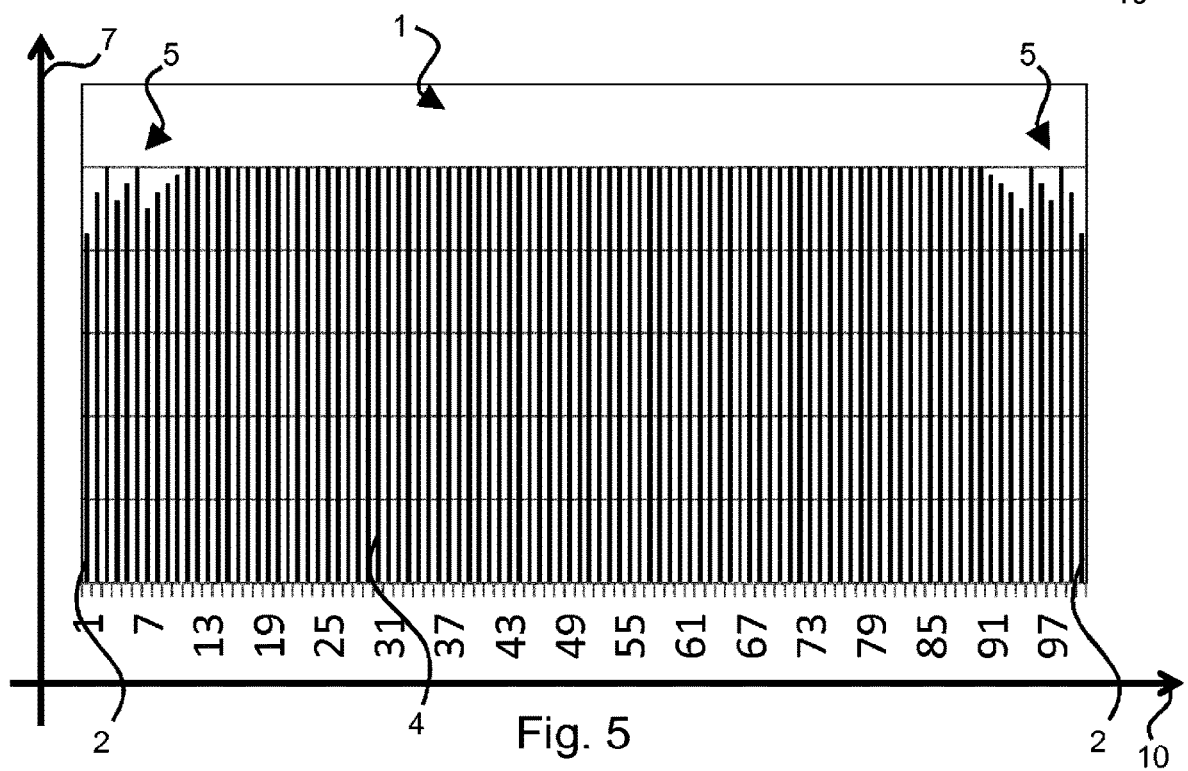
FIG. 5 illustrates temperature distribution in a cell unit as a function of its position in the fuel-cell stack arising from the thermal conductivities illustrates in FIG. 4.
Figure 6:
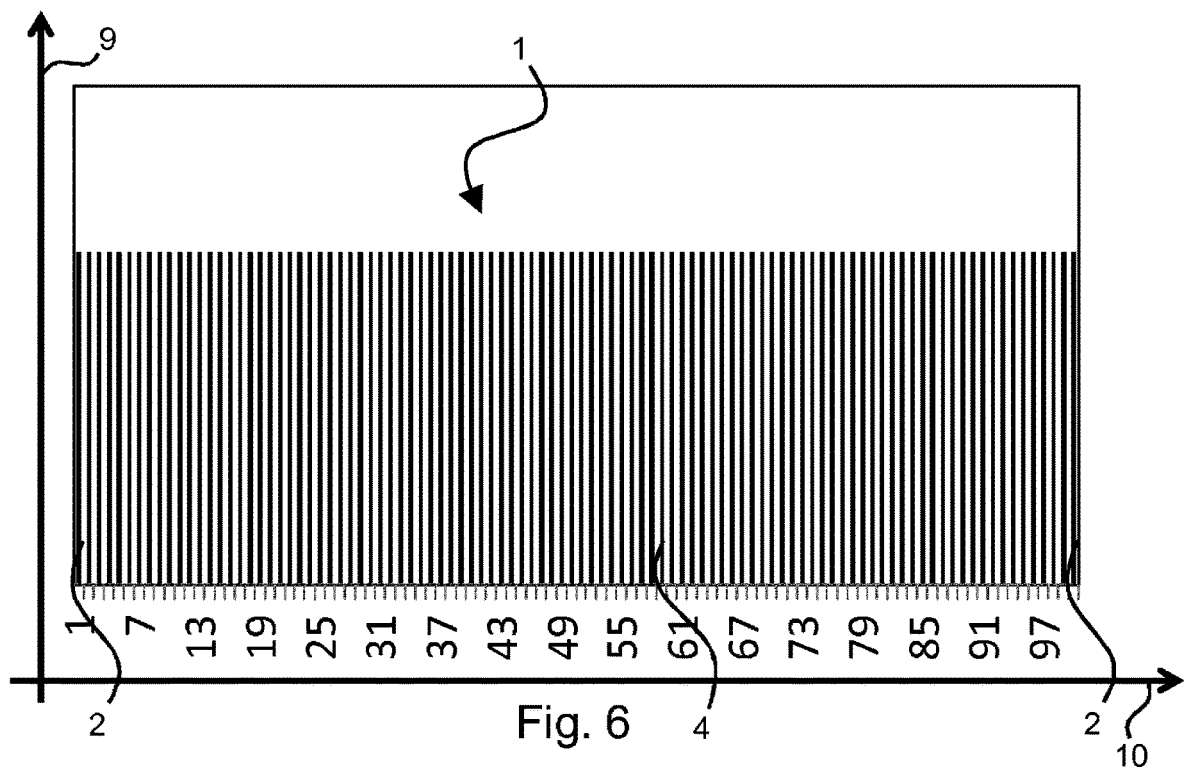
FIG. 6 illustrates a distribution of the thermal conductivity of a fuel-cell stack known from the prior art.

FIG. 4 refers to the possibility that the thermal conductivity 9 of the gas diffusion layers in the cell-unit block 5 can also be selected in stages, with several cell units 2 in a stage 6, so that, overall, the fuel-cell stack 1 can be formed with fewer different components, and thus cost advantages arise during production and assembly. FIG. 5 again shows the temperature distribution resulting from the distribution of the thermal conductivity 6 of the gas diffusion layers in the edge cell units 2, wherein it is shown that this temperature distribution is significantly improved in comparison with the temperature distribution shown in FIG. 7 from the prior art.

It should be pointed out that the cell-unit block 5 can comprise between 2 and 20 cell units 2 at each edge location, wherein, in particular, 10 cell units 2 per cell-unit block 5 may be used in view of the reduced complexity in comparison with the choice with 20 cell units 2.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A fuel-cell system, comprising:
a fuel-cell stack including a plurality of cell units, each cell unit having a respective gas diffusion layer,
wherein a first gas diffusion layer of a first cell unit at a first end of the fuel cell stack has a first heat transfer mechanism of reduced efficiency in comparison with a second heat transfer mechanism of a second gas diffusion layer of a second cell unit at a middle of the fuel-cell stack, and a third gas diffusion layer of a third cell unit at a second end of the fuel cell stack opposite to the first end of the fuel cell stack has a third heat transfer mechanism of reduced efficiency in comparison with the second heat transfer mechanism of the second gas diffusion layer of the second cell unit at the middle of the fuel-cell stack.

2. The fuel-cell system according to claim 1, wherein a first thermal conductivity of the first gas diffusion layer of the first cell unit at the first end of the fuel cell stack is less than a second thermal conductivity of the second gas diffusion layer of the second cell unit at the middle of the fuel-cell stack.

3. The fuel-cell system according to claim 2, wherein a plurality of adjacent cell units at the first end of the fuel cell stack are combined to form a cell-unit block in which the thermal conductivity of the gas diffusion layers of the adjacent cell units is less than the second thermal conductivity of the second gas diffusion layer of the second cell unit from at the middle of the fuel-cell stack.

4. The fuel-cell system according to claim 3, wherein thermal conductivities of the gas diffusion layers of the adjacent cell units decreases towards the first end of the fuel cell stack.

5. The fuel-cell system according to claim 4, wherein thermal conductivities of the gas diffusion layers of the adjacent cell units decreases continuously towards the first end of the fuel cell stack.

6. The fuel-cell system according to claim 4, wherein thermal conductivities of the gas diffusion layers of the adjacent cell units decreases in stages towards the first end of the fuel cell stack, with several cell units in each stage.

7. The fuel-cell system according to claim 3, wherein the cell-unit block comprises between 3 and 20 cell units.

8. A motor vehicle having a fuel-cell system according to claim 1.

9. The fuel-cell system according to claim 1, wherein the first and third gas diffusion layers have the first and third heat transfer mechanisms of reduced efficiency in comparison with the second heat transfer mechanism of the second gas diffusion layer as a result of a production method of the first, second, and third gas diffusion layers.

10. The fuel-cell system according to claim 1, wherein the first and third gas diffusion layers having the first and third heat transfer mechanisms of reduced efficiency in comparison with the second heat transfer mechanism generate a more uniform temperature of individual cell units over an entire expanse of the fuel-cell stack than if the first, second, and third gas diffusion layers had matching heat transfer mechanisms.

\* \* \* \* \*